United States Patent
Miller et al.

(10) Patent No.: US 8,509,144 B2
(45) Date of Patent: *Aug. 13, 2013

(54) BENT PIPE BEAM SWITCHING FOR VIRTUAL UTILITY GATEWAYS

(71) Applicant: ViaSat, Inc., Carlsbad, CA (US)

(72) Inventors: Mark J. Miller, San Marcos, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,493

(22) Filed: Dec. 7, 2012

(65) Prior Publication Data

US 2013/0148570 A1 Jun. 13, 2013

Related U.S. Application Data

(60) Provisional application No. 61/568,569, filed on Dec. 8, 2011, provisional application No. 61/568,578, filed on Dec. 8, 2011, provisional application No. 61/591,810, filed on Jan. 27, 2012.

(51) Int. Cl.
*H04J 3/08* (2006.01)

(52) U.S. Cl.
USPC ............................................. 370/326

(58) Field of Classification Search
USPC ........ 370/310, 315–326, 339–345; 455/3.02, 455/427–431
See application file for complete search history.

(56) References Cited

U.S. PATENT DOCUMENTS

| 4,188,578 A | * | 2/1980 | Reudink et al. ............... 370/323 |
| 6,272,317 B1 | * | 8/2001 | Houston et al. ............... 455/13.1 |
| 6,377,561 B1 | | 4/2002 | Black |

(Continued)

FOREIGN PATENT DOCUMENTS

| EP | 1328073 A2 | 7/2003 |
| EP | 1478195 A1 | 11/2004 |

(Continued)

OTHER PUBLICATIONS

Lowry et al. Advanced Communications Technology Satellite. System Handbook, NASA TM-101490, revisions Sep. 30, 1993, 126 pages.

(Continued)

*Primary Examiner* — Frank Duong
(74) *Attorney, Agent, or Firm* — Kilpatrick Townsend & Stockton LLP

(57) ABSTRACT

A method for communicating includes utilizing a satellite comprising receivers, transmitters, transmit switches, and a gateway switch structure. Prior to a time T, each of at least P receivers are used to receive one of at least P signals from P gateway terminals. During one frame, the gateway switch structure is used to switch the at least P signals to the plurality of transmit switches. Each of the at least P signals are switched into fixed location beams. After time T and before a time T2, each of at least Q receivers are used to receive a different one of at least Q signals from Q gateway terminals. During one frame, the gateway switch structure is used to switch the at least Q signals to the plurality of transmit switches. Each of the at least Q signals are switched into fixed location beams. Q and P are non-zero positive integers and Q<P.

23 Claims, 8 Drawing Sheets

(56) References Cited

U.S. PATENT DOCUMENTS

| | | |
|---|---|---|
| 6,522,643 B1 | 2/2003 | Jacomb-Hood et al. |
| 6,625,129 B1 | 9/2003 | Olds |
| 6,801,565 B1 | 10/2004 | Bottomley et al. |
| 6,898,428 B2 | 5/2005 | Thorburn et al. |
| 6,957,078 B1 | 10/2005 | Yousefi et al. |
| 6,992,992 B1 | 1/2006 | Cooper |
| 7,773,942 B2 | 8/2010 | Hudson et al. |
| 8,144,643 B2 | 3/2012 | Miller et al. |
| 8,149,761 B2 | 4/2012 | Hudson et al. |
| 8,195,090 B2 | 6/2012 | Treesh et al. |
| 8,218,476 B2 | 7/2012 | Miller et al. |
| 8,340,015 B1 | 12/2012 | Miller |
| 8,340,016 B1 | 12/2012 | Miller |
| 2002/0159403 A1 | 10/2002 | Reddy |
| 2003/0096610 A1 | 5/2003 | Courtney et al. |
| 2003/0134592 A1 | 7/2003 | Franzen et al. |
| 2004/0166801 A1 | 8/2004 | Sharon et al. |
| 2005/0197060 A1 | 9/2005 | Hedinger et al. |
| 2007/0135051 A1 | 6/2007 | Zheng et al. |
| 2008/0146145 A1 | 6/2008 | Pateros et al. |
| 2009/0023384 A1 | 1/2009 | Miller |
| 2010/0255776 A1 | 10/2010 | Hudson et al. |
| 2012/0147812 A1 | 6/2012 | Hudson et al. |

FOREIGN PATENT DOCUMENTS

| | | |
|---|---|---|
| WO | 98/32245 | 7/1998 |
| WO | 2008/027974 A2 | 3/2008 |
| WO | 2011/139991 A1 | 11/2011 |

OTHER PUBLICATIONS

Gedney et al. ACTS Technology Description and Results, National Aeronautics and Space Administration, Prepared under Contract NAS3-23790, Glen Research Center, Feb. 2000, 158 pages.

Gedney et al. Advanced Communications Technology Satellite (ACTS), NASA Lewis Research Center, 1989, 12 pages.

Berk et al. On-Board Processing for Future Satellite Communications Systems: Comparison of FDM, TDM, and Hybrid Accessing Schemes, MTR 8701 MITRE Bedford MA, Jun. 1982, 192 pages.

Signatron, Inc. 30/20 GHz FSS Feasibility Study Final Report JPL Contract No. 957641, Feb. 12, 1987, 296 pages.

Krawczyk, R. The Advanced Communications Technology Satellite—Performance, Reliability and Lessons Learned, ACTS Conference 2000 Proceedings, pp. 175-184.

Advanced Communications Technology Satellite (ACTS) Technology System Overview, retrieved on Jul. 27, 2012 at http://acts.grc.nasa.gov/technology/index.shtml, 2 pages.

Advanced Communications Technology Satellite (ACTS), Technology Spacecraft, retrieved on Jul. 27, 2012 at https://acts.grc.nasa.gov/technology/spacecraft/index.shtml, 2 pages.

Advanced Communications Technology Satellite (ACTS), Technology Spacecraft Specifications, retrieved on Jul. 27, 2012 at https://acts.grc.nasa.gov/technology/spacecraft/specs.shtml, 6 pages.

Advanced Communications Technology Satellite (ACTS), Technology Spacecraft, Multiple Hopping Beam Antennas, retrieved on Jul. 27, 2012 at https://acts.grc.nasa.gov/technology/spacecraft/multihop.shtml, 2 pages.

Advanced Communications Technology Satellite (ACTS), Technology Spacecraft, On-Board Baseband Processing (BBP) and Switching, retrieved on Jul. 27, 2012 at https://acts.grc.nasa.gov/technology/spacecraft/bbp.shtml, 2 pages.

Advanced Communications Technology Satellite (ACTS), Technology Spacecraft, Microwave Switch Matrix (MSM), retrieved on Jul. 27, 2012 at https://acts.grc.nasa.gov/technology/spacecraft/msm.shtml, 1 page.

Advanced Communications Technology Satellite (ACTS), Technology Spacecraft, Adaptive Rain Fade Compensation, retrieved on Jul. 27, 2012 at https://acts.grc.nasa.gov/technology/spacecraft/rainfade.shtml, 2 pages.

Advanced Communications Technology Satellite (ACTS), Technology Earth Stations, retrieved on Jul. 27, 2012 at https://acts.grc.nasa.gov/technology/earthstations/index.shtml, 2 pages.

Ogawa et al. Wideband InterNetworking Engineering Test and Demonstration Satellite (WINDS), National Institute of Information and Communications Technology, vol. 54 No. 4 Sections 1-7, 2007, retrieved on Jul. 27, 2012 at http://www.eoportal.org/directory/pres_WINDSWidebandInterNetworkingengineeringtestandDemonstrationSatellite.html, 120 pages.

WINDS (Wideband InterNetworking engineering test and Demonstration Satellite), retrieved on Jul. 27, 2012 at http://www.eoportal.org/directory/pres_WINDSWidebandInterNetworkingengineeringtestandDemonstrationSatellite.html, 14 pages.

Arnold et al., Mobile Communications in a Geosynchronous Regenerative Satellite Mesh (Rsm) System, pp. 1-6, Hughes Network Systems, Germantown, Maryland, 2006.

Beam Forming Networks, Application Note, pp. 1-36. EMS Technologies, Inc. Aug. 2004, Revision B.

Couchman, A. et al. Defocused Array Fed Reflector Antennas for Ka, Broad Band Satellites, pp. 1-8, 2005.

Franchi et al., Technology Trends and Maket Drivers for Broadband Mobile Via Satellite: Inmarsat Bgan, pp. 1-9, London, United Kingdom, 2001.

Gopal et al., Regenerative Satellite Mesh System for Realtime Multi-Party Multimedia Traffic Hughes Network Systems, LLC (Hughes) Germantown, MD, 2009.

Gopal et al., Technology Readiness of Future Generation Networks Leveraging Regenerative Satellite Mesh Architecture—A Spaceway Perspective , pp. 1-7, Hughes Network Systems, LLC, Germantown, MD, 2006.

Gopal, R. Innovations in Satellite Networking Technology and Products, pp. 1-10. Hughes, SIA, Dec. 7, 2006.

Hadinger et al., Next Generation High Capacity Ka-Band Satellite Systems, pp. 1-8, Northrop Grumman Space Technology, Redondo Beach, CA., 2007.

Kitao et al., Proto-Flight Model Development of the Multi-beam Active Phased Array Antenna for WINDS, pp. 1-4, 2007.

"Kizuna" (WINDS) (Wideband InterNetworking engineering test and.Demonstration Satellite) (Launched by H-IIA F14), WINDS Project Team, Office of Space Applications, Japan Aerospace Exploration Agency, 17 pages, 2008.

Mallison et al., Enabling Technologies for the Eurostar Geomobile Satellite, p. 1-10. 19th AIAA International Communications Satellite Systems Conference. ICSSC, 2001.

Nelson, J. Top Satellite Technology at Forefront. Boeing Frontiers, 1(3). (2002). 5 pages.

Reudink, D.O. et al., A Scanning Spot-Beam Satellite System, Bell System Technical Journal, vol. 56, Oct. 1977, p. 1549-1560.

Rooney, K. J. Evolving Satellite Markets and their Enabling Technologies, pp. 1-18, Boeing Satellite Systems, Los Angeles, CA, Oct. 2002.

Roper et al., WGS phased arrays support next generation DoD SATCOM capability. IEEE International Symposium on Phased Array Systems and Technology, 2003, pp. 82-87 (2003).

Rustako, A. J. Jr. et al., An Experimental Scanning Spot Beam Satellite System Implementing 600 Mbit/Sec Tdma, IN: International Conference on Digital Satellite Communications, 6th, Phoenix, AZ, Sep. 19-23, 1983, Proceedings (A85-15451 04-32). New York, Institute of Electrical and Electronics Engineers, 1983, p. XI-18 to XI-23.

Satellite Provision of Next Generation Broadband Services in UK, Prepared for the Broadband Stakeholder Group, pp. 1-27, Oct. 29, 2007. Information Technology Telecommunications and Electronics Association, London.

Science Applications International Corporation. Satellite Communications Technology Database. NASA CR-2001-210563-PART2, Mar. 2001, 71 pages.

Stone, J. Spaceway 3 Takes Flight pp. 1-4. Near Earth LLC (Aug. 2007).

Sunderland et al., Megagate ASICs for the Thuraya Satellite Digital Signal Processor, pp. 1-8, Proceedings of the International Symposium on Quality Electronic Design, 2002 IEEE Computer Society (2002).

Torlak et al. Fast Estimation of Weight Vectors to Optimize Multi-Transmitter Broadcast Channel Capacity. IEEE Transactions on Single Processing, vol. 46, No. 1 Jan. 1998, 4 pages.

Whitefield et al., Spaceway Now and in the Future: On-Board IP Packet Switching Satellte Communication Network, pp. 1-7, Hughes Network Systems, LLC, Germantown, MD, 2006.

International Search Report corresponding to PCT Application No. PCT/US2010/026934, dated May 11, 2010, 12 pages.

International Search Report corresponding to PCT Application No. PCT/US2011/34845, dated Aug. 26, 2011, 13 pages.

International Search Report and Written Opinion for PCT Application No. PCT/US2012/048695, mailed on Oct. 23, 2012, 12 pages.

U.S. Appl. No. 13/560,825, filed Jul. 27, 2012.

U.S. Appl. No. 13/463,079, filed May 3, 2012.

U.S. Appl. No. 13/708,755, filed Dec. 7, 2012.

Communication Relating to the Results of the Partial International Search for PCT Application No. PCT/US2012/068464, dated Apr. 16, 2013, 4 pages.

* cited by examiner

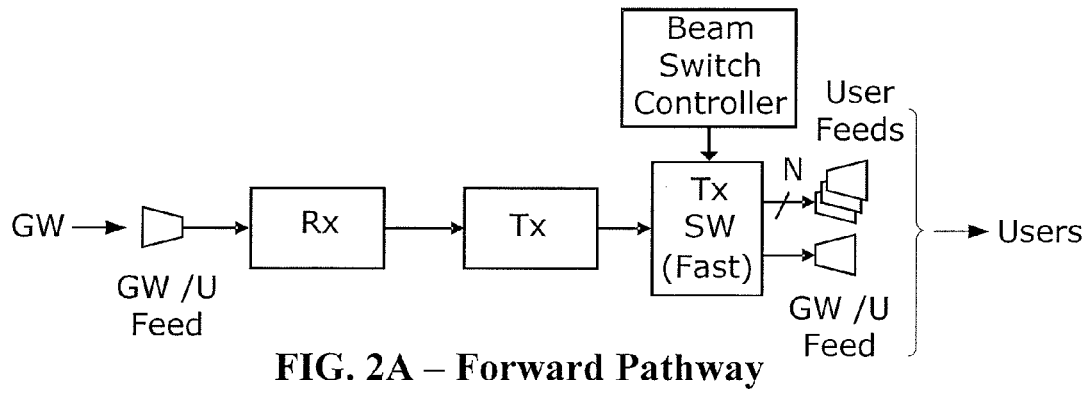
FIG. 2A – Forward Pathway
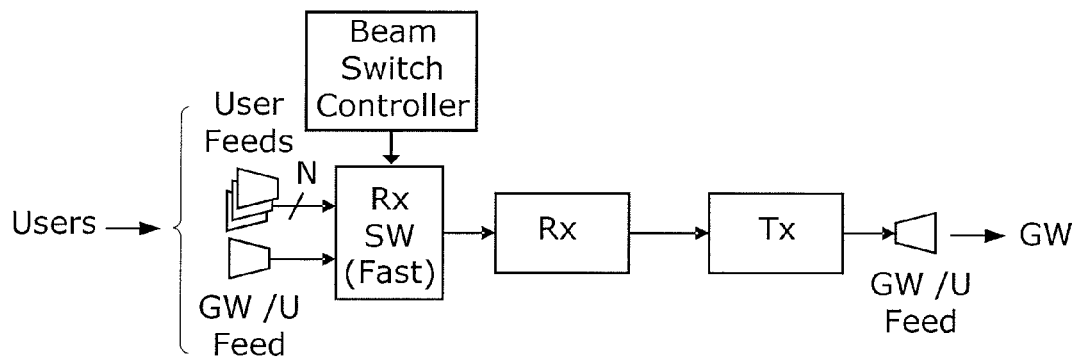
FIG. 2B – Return Pathway
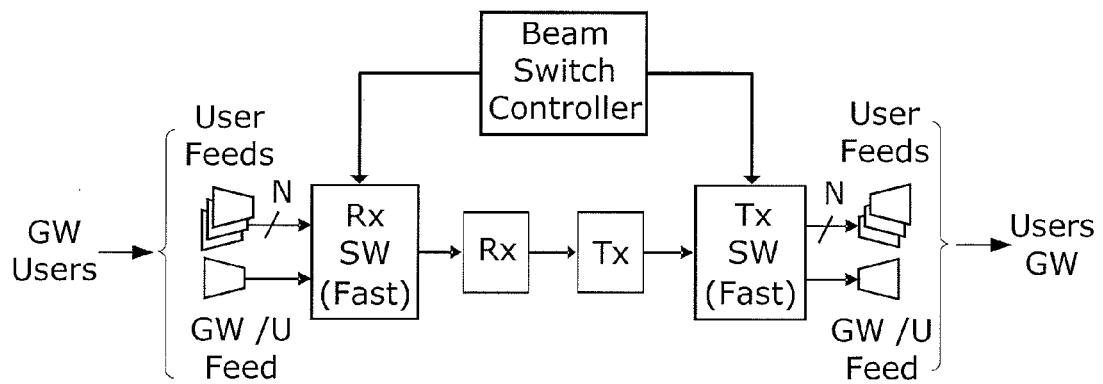
FIG. 2C – Forward / Return Pathway

|      |         | Rx Switch Settings |        |        | MxM Settings           | Tx Switch Settings |        |        |
|------|---------|--------|--------|--------|------------------------|--------|--------|--------|
| Slot | Use     | Rx SW1 | Rx SW2 | Rx SW3 | MxM                    | Tx SW1 | Tx SW2 | Tx SW3 |
| 1-4  | Forward | $GW_1$ | $GW_2$ | $GW_3$ | 1 -> 1<br>2 -> 2<br>3 -> 3 | $U_1$  | $U_2$  | $U_3$  |
| 5-8  | Return  | $U_1$  | $U_2$  | $U_3$  | 1 -> 1<br>2 -> 2<br>3 -> 3 | $GW_1$ | $GW_2$ | $GW_3$ |

FIG. 5A

|      |         | Rx Switch Settings |        |        | MxM Settings           | Tx Switch Settings |        |        |
|------|---------|--------|--------|--------|------------------------|--------|--------|--------|
| Slot | Use     | Rx SW1 | Rx SW2 | Rx SW3 | MxM                    | Tx SW1 | Tx SW2 | Tx SW3 |
| 1-2  | Forward | $GW_1$ | $GW_2$ | X      | 1 -> 1<br>2 -> 2<br>3 -> 3 | $U_1$  | $U_2$  | X      |
| 3    | Forward | $GW_1$ | $GW_2$ | X      | 1 -> 1<br>2 -> 3<br>3 -> 2 | $U_1$  | X      | $U_3$  |
| 4    | Forward | $GW_1$ | $GW_2$ | X      | 1 -> 3<br>2 -> 2<br>3 -> 1 | X      | $U_2$  | $U_3$  |
| 5-6  | Return  | $U_1$  | $U_2$  | X      | 1 -> 1<br>2 -> 2<br>3 -> 3 | $GW_1$ | $GW_2$ | X      |
| 7    | Return  | $U_1$  | X      | $U_3$  | 1 -> 1<br>2 -> 3<br>3 -> 2 | $GW_1$ | $GW_2$ | X      |
| 8    | Return  | X      | $U_2$  | $U_3$  | 1 -> 3<br>2 -> 2<br>3 -> 1 | $GW_1$ | $GW_2$ | X      |

X = don't care

FIG. 5B

BENT PIPE BEAM SWITCHING FOR VIRTUAL UTILITY GATEWAYS

CROSS-REFERENCES TO RELATED APPLICATIONS

The present application claims priority to U.S. Provisional Application Nos. 61/568,569, filed Dec. 8, 2011; 61/568,578, filed Dec. 8, 2011; and 61/591,810, filed Jan. 27, 2012; the disclosures of which are incorporated herein by reference in their entirety for all purposes.

Disclosures of U.S. Nonprovisional application Ser. Nos. 13/560,788, filed Jul. 27, 2012 and 13/560,825, filed Jul. 27, 2012 are incorporated herein by reference in their entirety for all purposes.

FIELD OF THE INVENTION

The present invention relates generally to satellite communication systems and, more particularly, to bent-pipe fixed beam switching for virtual utility gateways.

BACKGROUND

A hub-spoke satellite communication system typically includes a constellation of one or more satellites that link gateway terminals with user terminals. The gateway terminals provide an interface with a network such as the Internet or a public switched telephone network. Each gateway terminal typically services a number of user terminals located in one or more spot beams. Gateway terminals are subject to service interruptions due to weather, maintenance, disasters, etc. At such times, the affected gateway terminals may not be able to provide full capacity to the user terminals that they serve.

SUMMARY

Embodiments of the present invention provide increased flexibility in satellite communication systems by using bent-pipe fixed beam switching to provide virtual utility gateways.

BRIEF DESCRIPTION OF THE DRAWINGS

In some of the drawings a sub-label is associated with a reference numeral and follows a hyphen to denote one of multiple similar components. When reference is made to a reference numeral without specifying an existing sub-label, it is intended to refer to all such similar components.

FIGS. 2A-2C are simplified block diagrams of various examples of a pathway of a satellite in accordance with some embodiments of the present invention;

FIGS. 5A-5B illustrate specific examples of switching patterns before and after failure of a gateway in accordance with an embodiment of the present invention;

DETAILED DESCRIPTION

Figure 1:
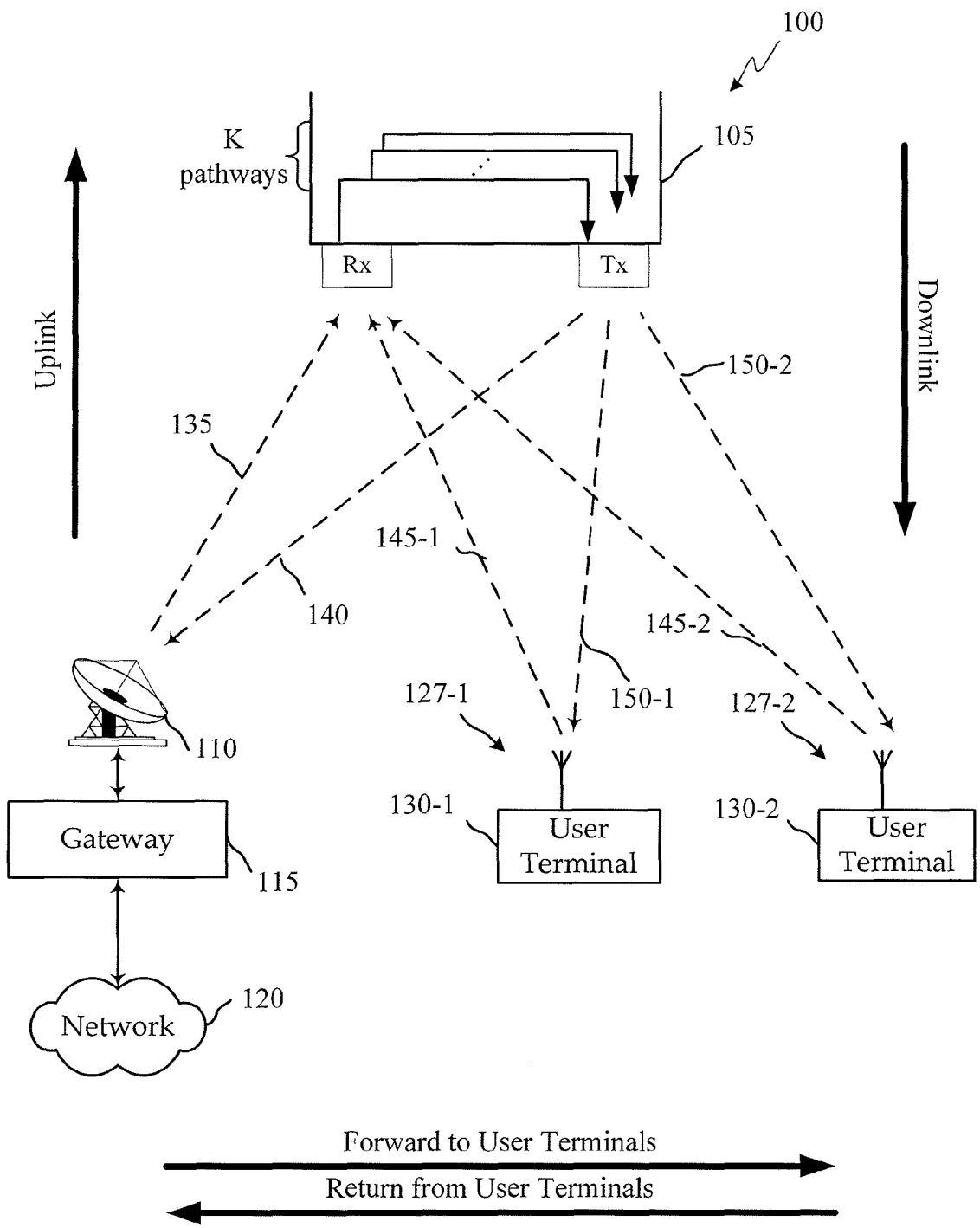
FIG. 1 is a simplified diagram of a hub-spoke satellite communication system in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, and are to be considered within the scope of the invention.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The term "coupled" as used herein does not require that the components be directly connected to each other. Instead, the term is intended to also include configurations with indirect connections where one or more other components may be included between coupled components. For example, such other components may include amplifiers, attenuators, isolators, directional couplers, redundancy switches, and the like.

FIG. 1 is a simplified diagram of a hub-spoke satellite communication system 100 in accordance with an embodiment of the present invention. The satellite communication system 100 may include a satellite 105 linking a gateway terminal 115 with one or more user terminals 130. The satellite communication system 100 includes space and ground segments. The space segment may include one or more satellites while the ground segment may include a number of user terminals, gateway terminals, network operations centers (NOCs), satellite and gateway terminal command centers, and the like. Not all elements are shown in the figure for clarity.

The gateway terminal 115 is sometimes referred to as a hub or ground station. The gateway terminal 115 may provide communication links 135, 140 between the gateway terminal 115 and the satellite 105. The gateway terminal 115 may also schedule traffic to the user terminals 130. Alternatively, the scheduling may be performed in other parts of the satellite communication system 100 (e.g., at one or more NOCs and/or gateway command centers—neither of which are shown in this embodiment). Scheduling information may be communicated among the NOC(s), gateway command center(s), satellite(s), and user terminals through a terrestrial network, a satellite command link, the communications system, etc. using conventional techniques and thus will not be described further.

The gateway terminal 115 may also provide an interface between a network 120 and the satellite 105. The gateway terminal 115 may receive data and information from the network 120 that is directed the user terminals 130. The gateway terminal 115 may format the data and information for delivery to the user terminals 130 via the satellite 105. The gateway terminal 115 may also receive signals carrying data and information from the satellite 105. This data and information may be from the user terminals 130 and directed to destinations accessible via the network 120. The gateway terminal 115 may format this data and information for delivery via the network 120.

The network 120 may be any suitable type of network, for example, the Internet, an IP network, an intranet, a wide-area network (WAN), a local-area network (LAN), a virtual private network (VPN), a public switched telephone network (PSTN), a public land mobile network, and the like. The network 120 may include various types of connections including wired, wireless, optical or other types of links. The network 120 may also connect the gateway terminal 115 with other gateway terminals that may be in communication with the satellite 105 or with other satellites.

The gateway terminal 115 may use one or more antennas 110 to transmit forward uplink signals 135 to the satellite 105 and to receive return downlink signals 140 from the satellite 105. The antenna 110 shown in FIG. 1 includes a reflector with high directivity in the direction of the satellite 105 and low directivity in other directions. The antenna 110 may be implemented in a variety of configurations and may include features such as high isolation between orthogonal polarizations, high efficiency in the operational frequency bands, low noise, and the like.

In some satellite communication systems there may be a limited frequency spectrum available for transmission. Communication links 135, 140 between the gateway terminal 115 and the satellite 105 may use the same, overlapping, or different frequencies as compared to the communication links 145, 150 between the satellite 105 and the user terminals 130. In some embodiments, the gateway terminal 115 may be located away from the user terminals 130, which facilitates frequency re-use. In other embodiments, the user terminals 130 may be located near the gateway terminal 115.

The satellite 105 may be a geostationary satellite that is configured to receive and transmit signals. The satellite 105 may receive the forward uplink signals 135 from the gateway terminal 115 and transmit corresponding forward downlink signals 150 to the user terminals 130. The satellite 105 may also receive return uplink signals 145 from the user terminals 130 and transmit corresponding return downlink signals 140 to the gateway terminal 115.

The satellite 105 may include one or more fixed directional antennas for reception and transmission of the signals 135, 140, 145, 150. For example, a directional antenna may include a fixed reflector with one or more feed horns for each spot beam. The feed horns may be employed for receiving uplink signals 135, 145 and transmitting downlink signals 140, 150.

Contours of a spot beam may be determined in part by the particular antenna design and depend on factors such as location of feed horn relative to a reflector, size of the reflector, type of feed horn, etc. Each spot beam's contour on the earth may generally have a conical shape (e.g., circular or elliptical), illuminating a spot beam coverage area for both transmit and receive operations. A spot beam may illuminate terminals that are on or above the earth surface (e.g., airborne user terminals, etc.). In some embodiments, directional antennas may be used to form fixed location spot beams (or spot beams that are associated with substantially the same spot beam coverage area over time).

The satellite 105 may operate in a multiple spot-beam mode, receiving and transmitting a number of signals in different spot beams. Each individual spot beam can serve a gateway, a number of user terminals, or both a gateway and a number of user terminals. In other words, the gateway 115 and the user terminals 130 of FIG. 1 may be within the coverage area of the same or different spot beams. Each spot beam may use a single carrier (i.e., one carrier frequency), a contiguous frequency range (i.e., one or more carrier frequencies), or a number of frequency ranges (with one or more carrier frequencies in each frequency range).

The satellite 105 may include a number of non-regenerative pathways (represented as K pathways in this embodiment). Each of the K pathways may function as a forward pathway or a return pathway at any given instant in time. For example, in some embodiments, one or more first pathways may be dedicated as forward pathways and one or more second pathways (different from the first pathways) may be dedicated as return pathways. In some embodiments, one or more pathways may be used for both forward and return at different times using a frame structure as described further herein. In some embodiments, a satellite may include fully switchable pathways used for forward and return, partially switchable pathways used for forward, partially switchable pathways used for return, dedicated (non-switching) pathways, and any combinations thereof. The uplink signals 135, 145 received by the satellite 105 may be directed along one or more of the pathways before being transmitted as downlink signals 140, 150.

The signals passing through a pathway need not be demodulated and re-modulated as in a regenerative or processing satellite architecture. Instead, signal manipulation by a non-regenerative satellite may provide functions such as frequency translation, polarization conversion, filtering, amplification, and the like, while omitting data demodulation/modulation and error correction decoding/encoding.

The forward downlink signals 150 may be transmitted from the satellite 105 to one or more of the user terminals 130. The user terminals 130 may receive the forward downlink signals 150 using antennas 127. In one embodiment, an antenna and a user terminal together comprise a very small aperture terminal (VSAT) with the antenna measuring about 0.75 meters in diameter and having about 2 watts of transmit power. In other embodiments, a variety of other types of antennas 127 may be used to receive the forward downlink signals 150 from the satellite 105. Each of the user terminals 130 may be connected to various consumer premises equipment (CPE) such as computers, local area networks (e.g., including a hub or router), Internet appliances, wireless networks, and the like.

The user terminals 130 may transmit data and information to a destination accessible via the network 120 (e.g., the Internet). The user terminals 130 may transmit the return uplink signals 145 to the satellite 105 using the antennas 127. The user terminals 130 may transmit the signals according to a variety of formats, including for example, formats defined by standards such as DVB (e.g. DVB-S, DVB-S2, DVB-RCS), WiMAX, LTE, DOCSIS, and similar standards in their native or adapted (modified) forms. In various embodiments, the physical layer techniques for each of the links 135, 140, 145, 150 may be the same as each other or may be different from each other.

FIGS. 2A-2C are simplified block diagrams of pathways that can be used in the satellite of FIG. 1. In general, the pathways may provide for conversion of uplink signals received by the satellite into downlink signals. Each of the pathways may include a receiver (Rx) and a transmitter (Tx). The receiver may include an LNA, and the transmitter may include a high power amplifier (HPA) (e.g., a traveling wave tube amplifier (TWTA)). The receiver and transmitter are not limited to these components, however, and may include other components as well, including, for example, components that provide frequency conversion (e.g., a down converter), filtering, and the like. The specific components included in each pathway and the configuration of those components may vary depending on the particular application.

The satellite communication system may use a framed hub-spoke beam-switched pathway access protocol, with time slots like a Satellite Switched Time-Division Multiple Access (SS/TDMA) scheme. However, each time slot of the frame may correspond to either forward link (gateway to user terminals) or return link (user terminals to gateway) traffic from a transmitting beam to a receiving beam. During normal operation, continuous streams of frames are typically used to facilitate communications. Multiple terminals may be serviced during each time slot using well known multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like). For example, a forward link time slot may be divided into multiple sub slots wherein transmissions to different terminals or groups of terminals are made in each sub slot. Similarly, a return link time slot may be divided into multiple sub slots. Some slots or sub slots may be reserved for network control or signaling information (e.g., communication of scheduling information).

Forward Pathways

FIG. 2A provides an example of a forward pathway in accordance with an embodiment providing a partial switching capability. In this embodiment, a receiver may be configured to receive forward uplink signals from a gateway via a gateway beam feed (GW/U Feed; in general GW feeds are labeled GW/U as they may, in some embodiments, also cover user terminals). In forward operation, the gateway beam feed may receive signals from one or more gateway terminals (e.g., gateway terminal 115 of FIG. 1). The output of the receiver may be coupled to the input of a transmitter.

The transmitter may be coupled to a transmit switch (Tx SW). For example, the transmit switch may be positioned after the transmitter of the pathway along a signal path. The transmit switch may be used to control an output from the pathway. For example, the transmit switch may dynamically switch the transmission signal between any one of N user beam feeds (User Feeds) or a gateway beam feed (GW/U Feed). Each of the N user beam feeds may provide signals to one or more user terminals (e.g., user terminals 130 of FIG. 1). The gateway beam feed may provide signals to user terminals that are located within the same spot beam coverage area as the gateway terminal (hence the designation "GW/U"). The set of beams that share a common transmit switch is referred to as a transmit beam group. Although only a single gateway is shown, in some embodiments, more than one gateway may be used.

The transmit switch may cycle between different switch positions according to a beam group transmit switching pattern to provide forward link capacity to output beams associated with each of the output beams feeds. The beam group transmit switching pattern may be a set of switch positions versus time during a frame that defines which feed the transmit switch connects to the transmitter.

The beam group transmit switching pattern may be stored in memory at a beam switch controller. The beam group transmit switching pattern may be uploaded to the beam switch controller using an uplink signal that may be in-band (e.g., using particular time slots or carriers within the communications system) or out-of-band (e.g., using a separate command control and telemetry link to the satellite). The fraction of time the transmit switch spends in each position may determine the forward link capacity provided to each beam. Flexible allocation of forward link capacity is accomplished by altering the amount of time the transmit switch spends at each position. In other words, forward link capacity is flexibly allocated by changing the relative duty cycle by which the pathway serves the beams. The time allocation may be dynamic (e.g., varying with the hour of the day) to accommodate temporal variations of a load in each beam.

The transmit switch may be a fast switch (capable of switching rapidly, e.g., relative to a frame described further below). The switch may operate at radio frequency (RF) such as Ka band frequencies. In some embodiments, a ferrite switch may be used for the transmit switch. Ferrite switches may provide fast switching, low insertion loss (e.g., do not substantially impact equivalent isotropically radiated power (EIRP) or gain-to-noise-temperature (G/T)), and provide high power handling capabilities.

Return Pathways

FIG. 2B provides an example of a return pathway in accordance with an embodiment providing a partial switching capability. In this embodiment, a receive switch may select between any one of N user beam feeds (User Feeds) or a gateway beam feed (GW/U Feed). Each of the N user beam feeds may include return signals from one or more user terminals (e.g., user terminals 130 of FIG. 1). The gateway beam feed may include return signals from user terminals that are located within the same spot beam coverage area as the gateway terminal (hence the designation "GW/U"). The receive switch (Rx SW) output may be coupled to the pathway receiver. For example, the receive switch may be before the receiver of the pathway along a signal path. The set of beams that share a common receive switch is referred to as a receive beam group.

Some embodiments may include one or more LNAs before the receive switch. For example, each input beam feed may have an associated LNA with the receive switch positioned after the LNA. Alternatively, a summer may be used to combine outputs from the LNAs, and the LNAs may be switched on and off to implement the switching function of the receive switch.

The pathway of FIG. 2B may also include a transmitter configured to provide return downlink signals to a gateway beam feed (GW/U Feed). In the return operation, the gateway beam feed may include signals to one or more gateway terminals (e.g., gateway terminal 115 of FIG. 1).

The receive switch may cycle between different switch positions according to a beam group receive switching pattern to provide return link capacity to input beams associated with each of the input beams feeds. The operation and control (using a beam switch controller) of the receive switch may be similar to that of the transmit switch discussed above (i.e., a beam group receive switching pattern may be communicated to the satellite and used to provide a time varying and flexible allocation of capacity on the return links to different beams in an analogous manner to the forward link operation described above).

Forward/Return Pathways

FIG. 2C provides an example of a forward/return pathway in accordance with an embodiment providing a full switching capability. In this embodiment, a receiver may be coupled to a receive switch (Rx SW), and a transmitter may be coupled to a transmit switch (Tx SW). The receive switch may be used to control the input to the pathway, and the transmit switch may be used to control the output from the pathway. The set of beams that share transmit and receive switches is referred to as a beam group.

Operation of the forward/return pathway may be similar to the operation of the forward pathway and return pathway discussed above. The transmit and receive switches may cycle through different positions to connect the pathway to different feeds at different times, effectively sharing the capacity provided by the pathway across multiple beams. According to an embodiment of the invention, the beam group switching pattern of the forward/return pathway in FIG. 2C may be arranged such that a portion of a frame is dedicated to forward link operation (e.g., wherein the receive switch is positioned to receive from a gateway feed and the transmit switch is positioned to transmit to a user feed), while another portion of the same frame is dedicated to return link operation (e.g., wherein the receive switch is positioned to receive from a user feed and the transmit switch is positioned to transmit to a gateway feed).

In some embodiments, the beam group switching patterns may be the same from frame-to-frame (i.e., repeated in each of a plurality of consecutive frames), while in other embodiments, the beam group switching patterns may be changed from frame-to-frame. In yet other embodiments, a particular beam group switching pattern may be used for a particular time duration while another beam group switching pattern may be used for a different time duration (e.g., different times of the day, different days of the week, or the like). Many variations, modifications, and alternatives of switching patterns may be used within the embodiments disclosed herein. Whether the beam group switching patterns remain the same or change may depend on a desired capacity allocation amongst beams and/or a desired ratio between forward and return capacity. Beam group switching patterns may be updated on an irregular (e.g., when a system operator identifies a new pattern that would be provide a more optimal allocation of capacity) or on a regular (e.g., hourly, daily) basis.

Virtual Utility Gateways

At times, a gateway may be unable to provide a desired level of service for its normal user traffic. For example, service degradation in the form of a complete interruption may occur because of maintenance, weather, natural disaster, and other such events. At other times, service may be degraded due to interference or rain fading that, while not a complete disruption, causes undesirable levels of performance (e.g., in some systems using adaptive coding and modulation, high channel attenuation may result in an undesirably low-efficiency modulation and coding point being selected). At these degraded service times, the normal traffic of a gateway may temporarily be handled in part or in full by transferring some or all of this traffic to another gateway. For example, additional "utility" gateways may be provided that are not specifically associated with particular user spot beams. These utility gateways may have the capability to quickly assume the traffic demands of the affected gateway(s) with minimal or no disruption to the users served by the affected gateway. Traffic may be switched to the utility gateways by switching the transmit and/or receive switch of a pathway to feeds corresponding to the utility gateway during some slots of the frame.

Implementing a physical utility gateway is similar to implementing a normal traffic gateway. It requires an antenna, etc. and may require all the resources of a normal traffic gateway. As well, a mechanism (e.g., switches, protocols, etc.) is used to transfer user traffic from the affected gateway over to the utility gateway (and back again when the degradation has ended). For example, network traffic may be routed to/from a core node on an IP packet by IP packet basis to the appropriate gateway as coordinated by the core node or other elements within the network.

When a number of gateways service a number of user beams, it may be possible to share the load of one degraded gateway among one or more capable gateways. This load sharing creates a "virtual" utility gateway. When a gateway is degraded, a number of (non degraded) gateways may each provide slightly less capacity to their normal beams, while each contributes a portion of their capacity to the customers normally served by the degraded gateway. A number of physical gateways may be involved in providing the services of the degraded gateway by coordinating the flow of traffic across the multiple gateways thereby providing the virtual utility gateway.

In some embodiments, gateway sites may be placed sufficiently far apart from each other to allow reuse of the same frequency band. For example, the system can provide both switching in the satellite (to dynamically route between user beams and gateway beams according to gateway switching patterns) and switching on the ground (as discussed previously, e.g. through a core node). One way to implement the switching at the satellite is through gateway switch groups as will now be discussed.

Gateway Switch Groups

Figure 3:
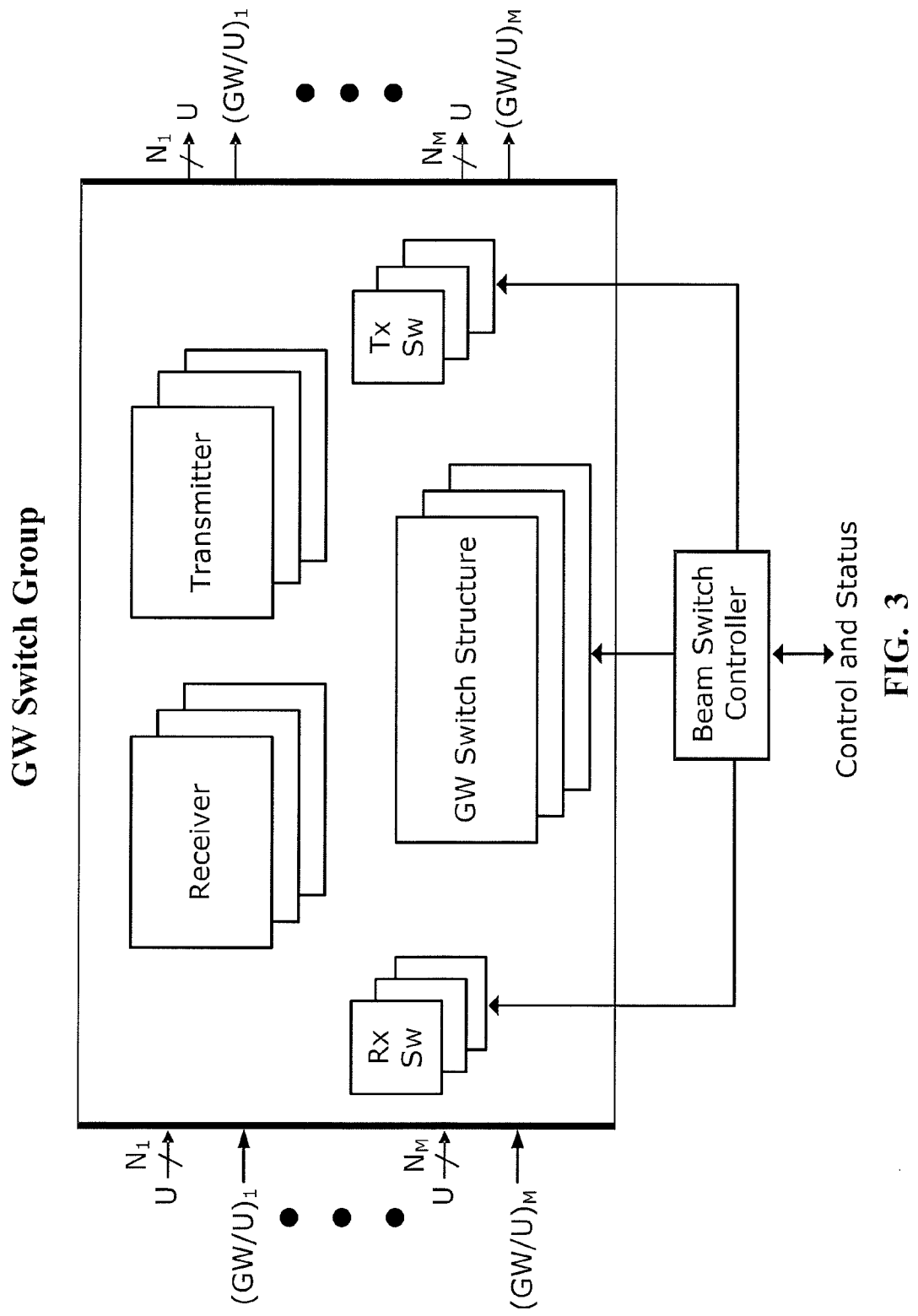
FIG. 3 is a simplified block diagram of a gateway (GW) switch group of a satellite in accordance with an embodiment of the present invention.

Recall that the set of beams that share transmit and receive switches is referred to as a beam group. Beam groups may be further aggregated into what is referred to as a gateway (GW) switch group. FIG. 3 is a simplified block diagram of a GW switch group in accordance with an embodiment of the present invention. The GW switch group includes a number of pathways (e.g., some of the K pathways shown in FIG. 1). In accordance with an embodiment, a satellite may service a number of GW switch groups, each with a number of receivers, transmitters, receive switches, transmit switches, and GW switch structures. The switches may be controlled by a beam switch controller as discussed previously.

The GW switch structure generally provides switching capability between inputs and outputs within the GW switch group to provide cross connections between pathways as will be described in further detail. Possible inputs and outputs of the GW switch structure include one or more of the following: (a) a first set of inputs may be uplink signals and a first set of outputs may be input signals to receive switches and a second set of inputs may be output signals from transmit switches and a second set of outputs may be downlink signals (b) the inputs may be output signals from receivers and the outputs may be input signals to transmitters. In other words, for example (a), the GW switch structure may be deployed between the uplink signals (e.g., accepting outputs from antenna feeds or receive low noise amplifiers) and the Rx switch, and further deployed between the Tx switch and the downlink signals (e.g., providing outputs to antenna feeds or TWTAs); for example (b), the GW switch structure may be deployed between the receivers and transmitters.

As shown in FIG. 3, a GW switch group includes receive switches (Rx SW) and transmit switches (Tx SW). Each receive and transmit switch in a beam group may service the same or a different number of user beams (hence the designations "$N_1$" through "$N_M$"). Both receive and transmit switches are illustrated, and can provide similar capability as described above for FIG. 2C. Alternate embodiments of a GW switch group may include only transmit switches (e.g., similar to FIG. 2A) or only receive switches (e.g., similar to FIG. 2B).

In contrast to the Tx switches and Rx switches that may provide switching within a beam group, the GW switch structure may provide switching between beam groups. In other words, the GW switch structure can provide cross connects between different pathways. For example, a forward uplink signal from the gateway beam feed $(GW/U)_1$ may be received at the receive switch $Rx\ SW_1$ and passed through the associated circuitry to the transmit switch $Tx\ SW_1$. From the transmit switch $Tx\ SW_1$ the signal may be output to any of the user beam feeds associated with that beam group. Using the receive and transmit switches in concert with the GW switch structure, however, a forward uplink signal from one gateway beam feed $(GW/U)_1$ may be switched to the transmit switch associated with another beam group, for example, switch $Tx\ SW_2$. The particular transmit switch may depend on the GW switch structure position. Depending on the configuration of the GW switch structure, capability to switch the signal may be provided to connect with one, two, or any other number, including all, of the user beam feeds associated with any of the beam groups in the GW switch group.

Using techniques similar to how the positions of the receive and transmit switches may be described by beam group switching patterns, the positions of the GW switch structure may be described by gateway switching patterns. A (gateway) beam switch controller can provide for control of the GW switch structure. In some embodiments, each GW switch group can include its own beam switch controller and in other embodiments, a single switch controller can control the switches across multiple GW switch groups. In other embodiments, a single switch controller can control all of the GW switch structures, Rx switches, and Tx switches for the entire satellite. The receive and transmit beam group switching patterns may be synchronized with the gateway switching pattern(s) to provide sequential beam switching during a frame.

Virtual Utility Gateways Via Gateway Switch Group

Virtual utility gateways may be implemented using a gateway switch group. When a gateway's capacity is degraded, one or more of the other gateways in the same gateway switch group may take over some or all of the traffic from the affected gateway (i.e., providing a diversity gateway capability). This virtual utility gateway capability may be accomplished by coordinating the traffic data among the gateways, for example, by using a ground network that contains core nodes that distribute user traffic to and from multiple gateways.

An example of virtual utility gateway operation will now be illustrated for forward link operation using three time periods. A first time period of normal operation (prior to a time T1) is followed by a second time period during which at least one gateway terminal has degraded capacity (after time T1 and before time T2). In the third time period, after time T2, normal operation is restored. The interval of the second time period is generally many frames in duration, but could be as small as one frame.

During the first time period, at least P of the receivers may each receive a different one of at least P forward link signals from P gateway terminals GW/U (where P is a non-zero positive integer). During a frame, the GW switch structure may sequentially switch the at least P forward link signals from the P gateway terminals to provide the at least P forward link signals to the transmit switches. The at least P forward link signals are provided to the transmit switches according to a first gateway switching pattern, and each of the at least P forward link signals is sequentially switched into fixed location beams according to a first beam group transmit switching pattern.

During the second time period, at least Q of the receivers may each receive a different one of at least Q forward link signals from Q gateway terminals GW/U (where Q is a non-zero positive integer and is less than P). During a frame, the GW switch structure may sequentially switch the at least Q forward link signals from the Q gateway terminals to provide the at least Q forward link signals to the transmit switches. The at least Q forward link signals are provided to the transmit switches according to a second gateway switching pattern, and each of the at least Q forward link signals is sequentially switched into fixed location beams according to a second beam group transmit switching pattern. In cases of high availability gateways and high availability terminals, the gateway switch structure may change from sequentially switching the at least P forward link signals to sequentially switching the at least Q forward link signals such that high availability customers are serviced by a high availability gateway.

During the third time period, at least P of the receivers may each receive a different one of at least P forward link signals from P gateway terminals GW/U. During a frame, the GW switch structure may sequentially switch the at least P forward link signals from the P gateway terminals to provide the at least P forward link signals to the transmit switches. The at least P forward link signals are provided to the transmit switches according to a third gateway switching pattern, and each of the at least P forward link signals is sequentially switched into fixed location beams according to a third beam group transmit switching pattern.

The first and third gateway switching patterns may be the same in some cases, and different in others. For example, during the period between times T1 and T2, the offered traffic served by the affected gateways may change such that the first and third gateway patterns may differ to serve the newly offered traffic. In other examples, the offered traffic may remain the same or similar such that the first and third gateway patterns are the same.

Virtual utility gateway capability for return links operate in an analogous manner but in the reverse direction, and thus will not be described further.

Switch Matrix Groups

Figure 4:
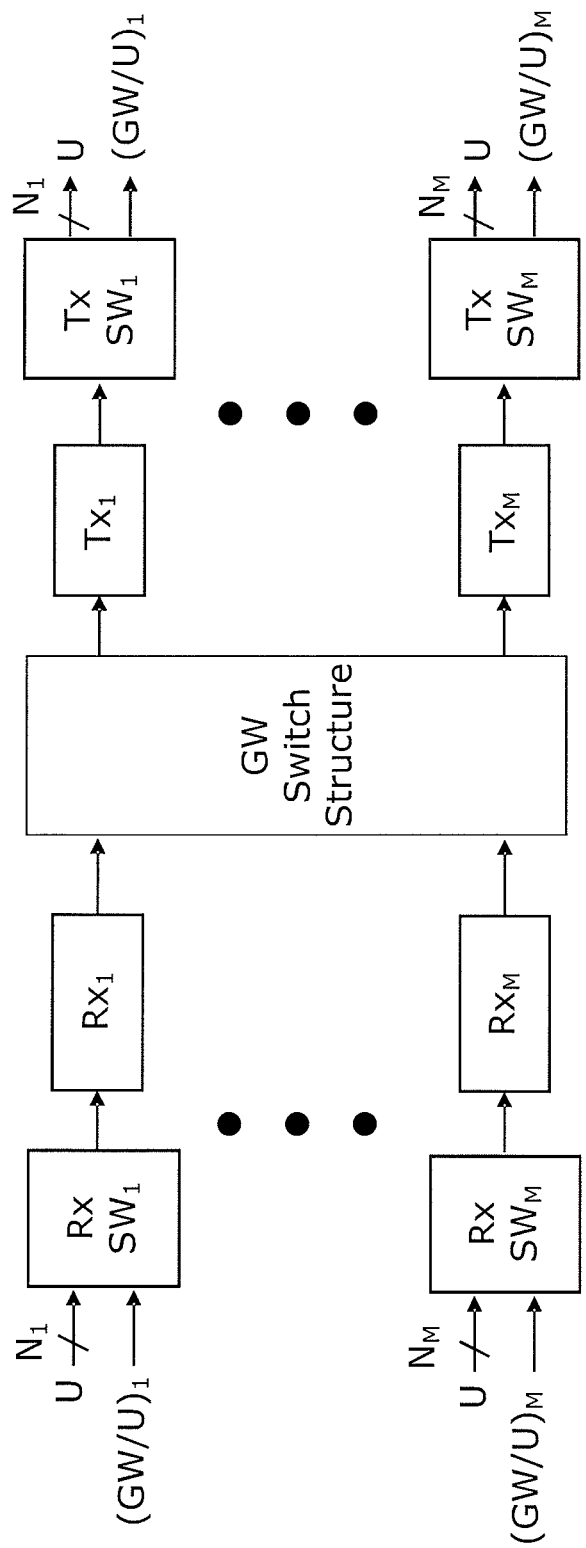
FIG. 4 is a simplified block diagram of a GW switch group employing a switch matrix in accordance with an embodiment of the present invention.

FIG. 4 is a simplified block diagram of one embodiment of a GW switch group employing a switch matrix. This GW switch group includes M pathways with M receivers (Rx) and M transmitters (Tx) and may implement M of the K (M≦K) pathways of the satellite of FIG. 1. The receive antenna feeds, beam switch controller, etc. discussed above are not shown in FIG. 4 to avoid unnecessarily cluttering the figure. An M×M switch matrix may provide the GW switch structure. The M×M switch matrix may be configured to direct an output signal from any one of the M receivers (e.g., from a receive portion of the pathway) to an input of any one of the M transmitters (e.g., to a transmit portion of the pathway). A switch matrix may be implemented by various techniques including, for example, an array of low mass solid state switches with hybrids.

In an example of the capability provided by the switch matrix, an input signal received at the receive switch (Rx $SW_1$) on the upper left of FIG. 4 may be output from the transmit switch (Tx $SW_1$) on the upper right of FIG. 4 or from the transmit switch (Tx $SW_M$) on the lower right of FIG. 4 depending on the setting of the M×M switch matrix. In some embodiments, as discussed further below, the switch matrix may provide a full M×M non-blocking cross connectivity (e.g., allowing M simultaneous one-to-one connections between any permutation of the M inputs and M outputs). In other embodiments, the switch matrix may provide less than a full M×M non-blocking cross connectivity (e.g., in an embodiment, the switch matrix may allow inputs to connect to various subsets of the outputs).

As shown in FIG. 4, fixed location beams associated with each receive switch and each transmit switch may include N user beams (U) and a gateway beam (GW/U). Feeds (such as the N User Feeds and the GW/U feed shown in FIG. 2B) may be coupled to inputs of each receive switch shown in FIG. 4. Signals from the fixed location beams are passed from these feeds to the receive switches. Feeds (such as the N User Feeds and the GW/U feed shown in FIG. 2A) may be coupled to outputs of each transmit switch shown in FIG. 4. Signals to the fixed location beams are passed from the transmit switches to these feeds. Note that each receive switch (or each transmit switch) may service the same number of user beams or a different number of user beams (hence the designations "$N_1$" and "$N_M$"). For example, the number of user beams may be 1, 2, 3, 5, 8 or any other suitable number. The receive switches and the transmit switches may be configured for fast switching as described above.

In a first mode of operation, the M×M switch matrix may be fixed to pass signals directly through from left to right (e.g., a pass though mode), such that the signals to and from each gateway terminal will take a similar path to that shown in FIG. 2C. In this mode of operation, each gateway terminal may provide capacity only to users in its beam group. In other modes of operation, the M×M switch matrix may provide cross connections (e.g., a cross connect mode) between gateway terminals and the user terminals in a beam group normally associated with another gateway. As described above, the switch matrix switching pattern may be synchronized to the receive and transmit beam group switching patterns. Thus, the service slots from one gateway may be allocated to any beam within the GW switch group, regardless of beam group association.

Virtual Utility Gateways Via Switch Matrix Groups

Figure 6:
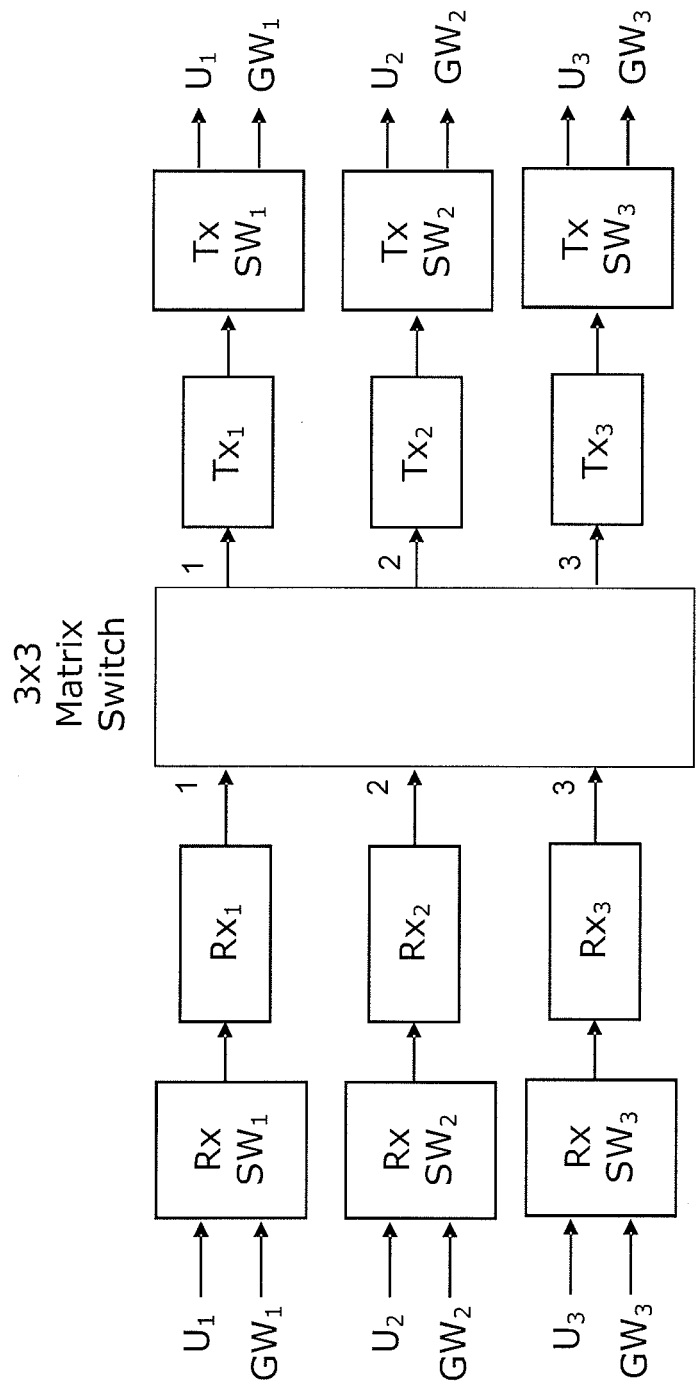
FIG. 6 is a simplified block diagram of a GW switch group employing a switch matrix in accordance with an embodiment of the present invention.

FIGS. 5A-5B illustrate a specific example of switching patterns before and after the failure of a gateway, demonstrating virtual utility gateway operations according to an embodiment of the present invention. These switching patterns are applied to the various switches present within the structure of a gateway switch group employing a switch matrix, such as that shown in FIG. 6. The system parameters used in this and other examples are chosen for clarity of discussion and not meant to limit the scope of the invention. These parameters are summarized below:

M=3

$N_1=1; N_2=1; N_3=1$

Rx switches have 2 positions—GW or U

Tx switches have 2 positions—GW or U

Specifically, the gateway switch group in this example contains 3 pathways (M=3), with 3 receivers (Rx) and 3 transmitters (Tx), as well as 3 receive switches (Rx SW) and 3 transmit switches (Tx SW). In this example, there are 3 gateways. To simplify the example, no active users are in any GW/U beam (thus the designation as GW, not GW/U) and each user beam group has just one user beam (U). Thus, $N_1=1$, $N_2=1$, and $N_3=1$. In the first pathway, the receive switch and transmit switch are associated with 1 user beam ($U_1$) and 1 gateway beam ($GW_1$). In the second pathway, the receive switch and transmit switch are associated with 1 user beam ($U_2$) and 1 gateway beam ($GW_2$). In the third pathway, the receive switch and transmit switch are associated with 1 user beam ($U_3$) and 1 gateway beam ($GW_3$). Each receive switch (Rx SW) has 2 possible positions—either connecting to the gateway beam (GW) or connecting to the user beam (U). Similarly, each transmit switch (Tx SW) has 2 possible positions—either connecting to the gateway beam (GW) or connecting to the user beam (U).

FIG. 5A illustrates a switching pattern used at a time prior to T1, when all three gateways are operational (P=M). Over the course of a frame, the three operational gateways serve the three user beams $U_1$, $U_2$, and $U_3$. Each frame is shown as comprising 8 slots. Slots 1-4 support forward traffic, and slots 5-8 support return traffic. Forward traffic is discussed first. In slots 1-4, gateway beam $GW_1$ is received and connected to user beam $U_1$ for transmission, gateway beam $GW_2$ is received and connected to user beam $U_2$ for transmission, and gateway beam $GW_3$ is received and connected to user beam $U_3$ for transmission. Return traffic operates in a similar manner, but in the reverse direction. In slots 5-8, user beam $U_1$ is received and connected to gateway beam $GW_1$ for transmission, user beam $U_2$ is received and connected to gateway beam $GW_2$ for transmission, and user beam $U_3$ is received and connected to gateway beam $GW_3$ for transmission. This is accomplished by following switching patterns of Rx switch settings, M×M switch matrix settings, and Tx switch settings shown in FIG. 5A. Using this switching pattern, the connectivity illustrated below in TABLE 1 is achieved:

TABLE 1

| SLOT | FORWARD | | | | RETURN | | | |
|---|---|---|---|---|---|---|---|---|
| | 1 | 2 | 3 | 4 | 5 | 6 | 7 | 8 |
| $GW_1$ | $U_1$ | $U_1$ | $U_1$ | $U_1$ | $U_1$ | $U_1$ | $U_1$ | $U_1$ |
| $GW_2$ | $U_2$ | $U_2$ | $U_2$ | $U_2$ | $U_2$ | $U_2$ | $U_2$ | $U_2$ |
| $GW_3$ | $U_3$ | $U_3$ | $U_3$ | $U_3$ | $U_3$ | $U_3$ | $U_3$ | $U_3$ |

Note that the overall switching pattern shown in FIG. 5A can be viewed as having separate portions. The portion corresponding to the Rx switch settings may be referred to as the "beam group receive switching pattern." The portion corresponding to the M×M switch matrix settings may be referred to as the "gateway switching pattern." The portion corresponding to the Tx switch settings may be referred to as the "beam group transmit switching pattern."

FIG. 5B illustrates a switching pattern used at a time after T1 and before T2, when only two out of three gateways are operational (Q=M−1). For instance, gateway $GW_3$ may have experienced a failure event at time T1, leaving only gateways $GW_1$ and $GW_2$ operational. Here, over the course of a frame, the two operational gateways serve the three user beams $U_1$, $U_2$, and $U_3$. Again, each frame is shown as comprising 8 slots, with slots 1-4 supporting forward traffic, and slots 5-8 supporting return traffic. In slots 1-2, gateway beam $GW_1$ is received and connected to user beam $U_1$ for transmission, and gateway beam $GW_2$ is received and connected to user beam $U_2$ for transmission. In slot 3, gateway beam $GW_1$ is received and connected to user beam $U_1$ for transmission, and gateway beam $GW_2$ is received and connected to user beam $U_3$ for transmission. In slot 4, gateway beam $GW_1$ is received and connected to user beam $U_3$ for transmission, and gateway beam $GW_2$ is received and connected to user beam $U_2$ for transmission. Return traffic operates in a similar manner, but in the reverse direction. Operation in slots 5-7 can be readily discerned and isn't explicitly described here.

Figure 7:
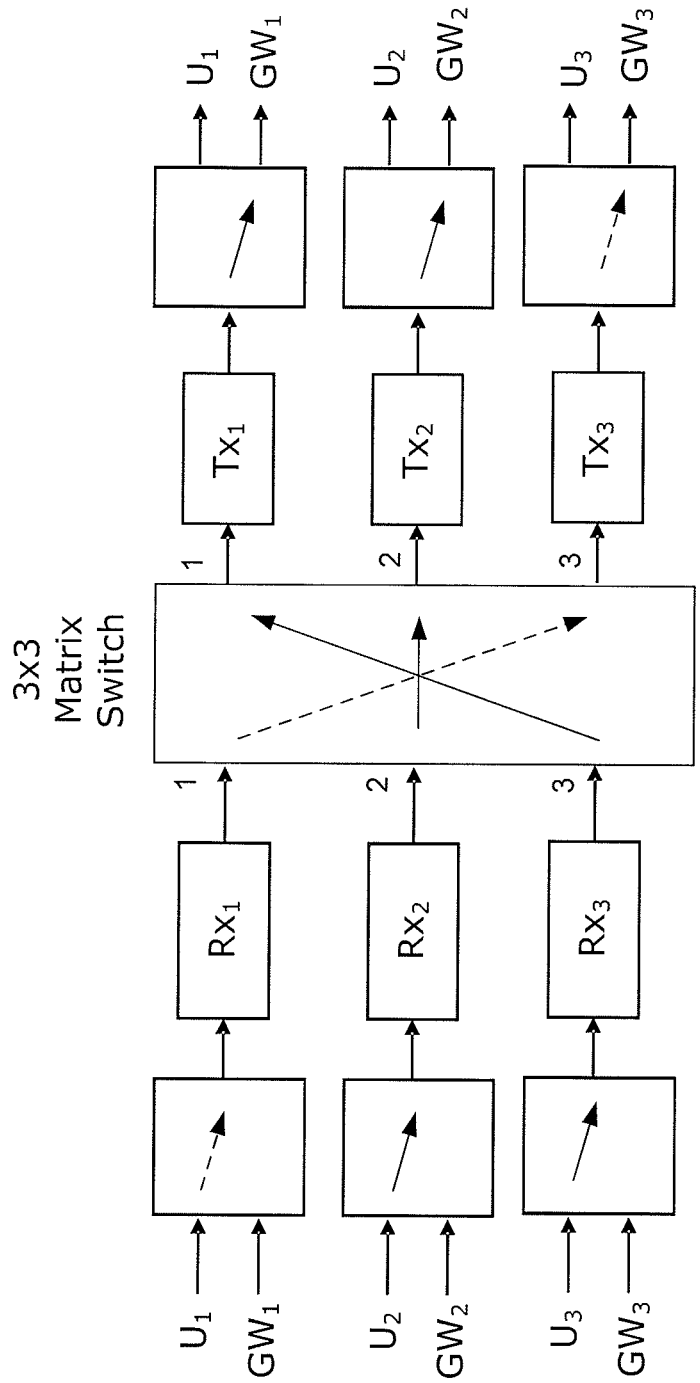
FIG. 7 is a simplified block diagram of a GW switch group employing a switch matrix and illustrates a specific example of a switching pattern in accordance with an embodiment of the present invention.

In slot 8, user beam $U_3$ is received and connected to gateway beam $GW_1$ for transmission, and user beam $U_2$ is received and connected to gateway beam $GW_2$ for transmission. The switch positions corresponding to return operation in slot 8 are depicted in FIG. 7. Rx $SW_2$ connects $U_2$ to $Rx_2$, while Rx $SW_3$ connects $U_3$ to $Rx_3$. Rx $SW_1$ connects $U_1$ to $Rx_1$, although this connection is a 'don't care' since input 1 of the switch matrix is connected to output 3, which corresponds to $GW_3$, the failed gateway. Input 2 of the switch matrix is connected directly across to output 2, while input 3 is connected to output 1. Output switches Tx $SW_1$ and Tx $SW_2$ each connect to their respective gateways (since this is a return slot for all these pathways). Tx $SW_3$ is also connected to its gateway $GW_3$, but this connection is again a 'don't care.'

All of this switching is accomplished by following switching patterns of Rx switch settings, M×M switch matrix settings, and Tx switch settings shown in FIG. 5B. Using this switching pattern, the connectivity illustrated below in TABLE 2 is achieved:

TABLE 2

| SLOT | FORWARD | | | | RETURN | | | |
|---|---|---|---|---|---|---|---|---|
| | 1 | 2 | 3 | 4 | 5 | 6 | 7 | 8 |
| $GW_1$ | $U_1$ | $U_1$ | $U_1$ | $U_3$ | $U_1$ | $U_1$ | $U_1$ | $U_3$ |
| $GW_2$ | $U_2$ | $U_2$ | $U_3$ | $U_2$ | $U_2$ | $U_2$ | $U_3$ | $U_2$ |
| $GW_3$ | X | X | X | X | X | X | X | X |

X = don't care

At time T2, gateway $GW_3$ may be restored and returned to operation. So at a later time after T2, the system may again utilize all three gateways to serve the three user terminals. This may be accomplished by returning to the switching pattern shown in FIG. 5A. Alternatively, if requirements have changed, a different switching pattern that utilizes all three gateways may be adopted.

Outer Switch Groups

Figure 8:
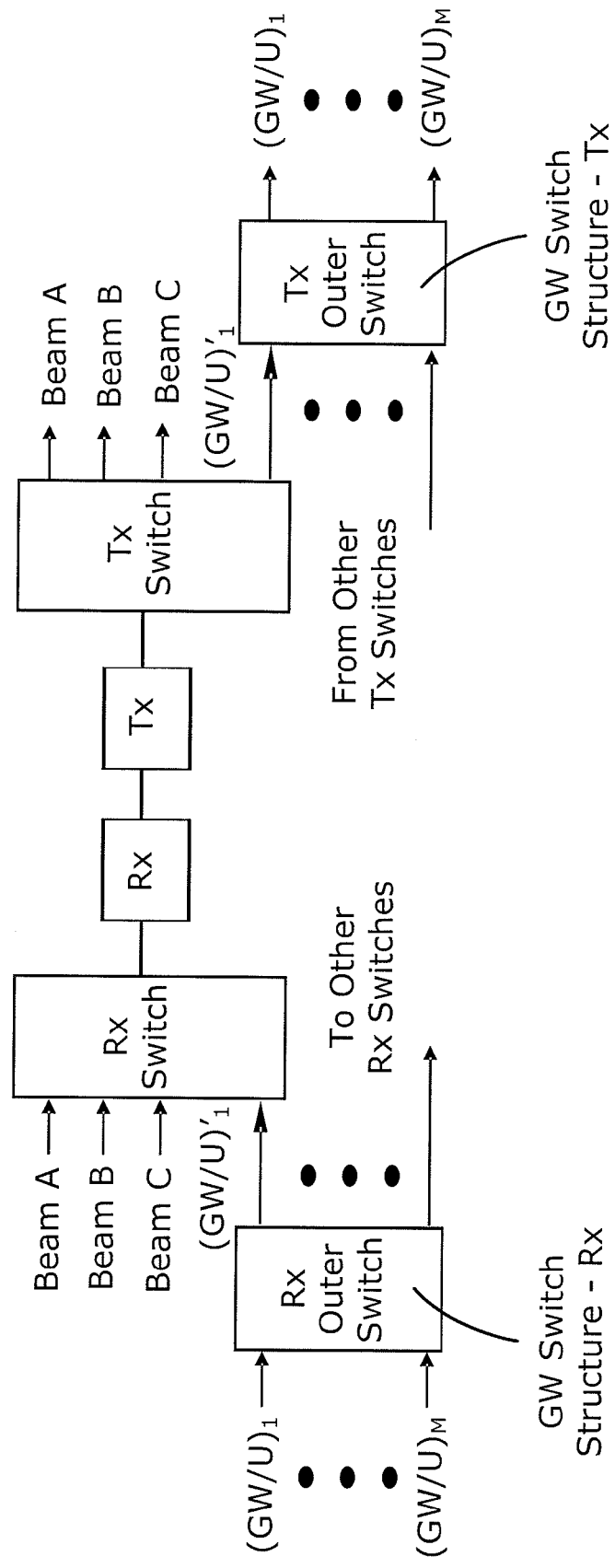
FIG. 8 is a simplified block diagram of a GW switch group using an outer switch structure in accordance with an embodiment of the present invention.

FIG. 8 is a simplified block diagram of a GW switch group using an outer switch structure in accordance with an embodiment of the present invention. The pathways (one is shown) may include a receiver and transmitter (and other components), for example, as discussed above. The pathways may include a Rx switch and a Tx switch (although, as discussed above, in some embodiments only an Rx switch or only a Tx switch may be include). The GW switch group may provide one or more of the K pathways in the satellite of FIG. 1. Receive antenna feeds, beam switch controller, etc. shown in previous figures and described above are not shown in this embodiment to avoid unnecessarily cluttering the figure.

Referring to a single pathway, the receiver may be coupled to a receive switch (Rx Switch), and the receive switch may be coupled to a receive-side outer switch (Rx Outer Switch). The receive switch may sequentially switch signals from fixed location beams into a receiver according to a beam group receive switching pattern, as described in examples above. For example, fixed location beams may include three user beams (Beam A, Beam B, Beam C) and a gateway beam $(GW/U)_1$. The receive-side outer switch may sequentially switch signals from fixed location gateway beams $(GW/U)_1$ to $(GW/U)_M$ into an input $(GW/U)'_1$ of the receive switch for the pathway according to a gateway switching pattern. Each of the gateway beams may also service user terminals that are located within the gateway beams. The receive-side outer switch may be coupled to other pathways through other receive switches as indicated by arrows extending from the right-side of the receive-side outer switch (the other pathways are not shown).

The transmitter may be coupled to a transmit switch (Tx Switch), and the transmit switch may be coupled to a transmit-side outer switch (Tx Outer Switch). The transmit switch may sequentially switch signals into fixed location beams according to a beam group transmit switching pattern, as described in examples above. The fixed location beams may include three user beams (Beam A, Beam B, Beam C) and a gateway beam $(GW/U)_1$. The transmit-side outer switch may sequentially switch signals from an output $(GW/U)'_1$ of the transmit switch for the gateway beam into fixed location gateway beams $(GW/U)_1$ to $(GW/U)_M$ according to a gateway switching pattern. Each of the gateway beams may also service user terminals that are located within the gateway beams. The transmit-side outer switch may be coupled to other pathways through transmit switches as indicated by arrows pointing into the left side of the transmit-side outer switch.

In some embodiments of the invention, a satellite for providing virtual utility gateway capability is provided. The satellite may include a plurality of pathways. The pathways may be as in any of the examples described above. Each pathway may be coupled to a means for beam switching among a beam group comprising a plurality of beams associated with the means for beam switching. For example, the means for beam switching can be: a transmit switch, a receive switch, a gateway switch structure, or any combination of a transmit switch, receive switch, and gateway switch structure as described above. The means for beam switching may switch among the plurality of beams according to a switching pattern.

The satellite may further include a means for cross connecting the plurality of pathways to each other. For example, the means for cross connecting may allow a receiver of a first one of the plurality of pathways to be connected to a transmitter of a second one of the plurality of pathways. The means for cross connecting may allow a plurality of connections and cross connections between pathways. The means for cross connecting may be used to provide a virtual utility gateway as described above. For example, the means for cross connecting can be a GW switch structure, a switch matrix, a receive outer switch, a transmit outer switch, a combination of both a receive outer switch and a transmit outer switch, a receive network, a transmit network, or a combination of both a transmit network and receive network as described above. The means for cross connecting can control the cross connection in accordance with a gateway switch schedule, which can control which cross connections are made during each slot of a frame. The means for cross connecting can be synchronized with the means for beam switching, for example as described above.

Embodiments of the present invention are not limited to the examples shown or described herein. For example, embodiments of the present invention may involve any number of receive-side outer switches, receive switches, pathways, transmit switches, and transmit-side outer switches. Furthermore, features of one or more embodiments may be combined with features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for communicating using a satellite having a forward link capability comprising:
    providing the satellite, the satellite comprising a plurality of receivers having inputs and outputs, a plurality of transmitters having inputs and outputs, the inputs of the plurality of transmitters coupled to the outputs of the plurality of receivers, a plurality of transmit switches coupled to the outputs of the plurality of transmitters, and a gateway switch structure coupled to at least one of: (a) the inputs of the plurality of receivers, (b) the outputs of the plurality receivers and the inputs of the plurality of transmitters, or (c) the outputs of the plurality of transmitters;
    using each transmit switch in the plurality of transmit switches to sequentially switch a forward link signal into multiple fixed location beams according to a beam group transmit switching pattern;
    prior to a time T1, using each of at least P receivers in the plurality of receivers to receive a different one of at least P forward link signals from P gateway terminals, and in the duration of one frame, using the gateway switch structure to sequentially switch the at least P forward link signals from the P gateway terminals, in order to provide the at least P forward link signals to the plurality of transmit switches, according to a first gateway switching pattern, and sequentially switching each of the at least P forward link signals into fixed location beams according to a first beam group transmit switching pattern;
    after time T1 and before a time T2, using each of at least Q receivers in the plurality of receivers to receive a different one of at least Q forward link signals from Q gateway terminals, and in the duration of one frame, using the gateway switch structure to sequentially switch the at least Q forward link signals from the Q gateway terminals, in order to provide the at least Q forward link signals to the plurality of transmit switches, according to a second gateway switching pattern, and sequentially switching each of the at least Q forward link signals into fixed location beams according to a second beam group transmit switching pattern;
    wherein P and Q are both non-zero, positive integers, and Q<P; and
    wherein the first and second gateway switching patterns are different.

2. The method of claim 1, wherein the gateway switch structure comprises a switch matrix positioned between the plurality of receivers and the plurality of transmitters.

3. The method of claim 1, wherein the gateway switch structure comprises at least one receive-side outer switch positioned before the plurality of receivers.

4. The method of claim 1, wherein each of the plurality of receivers comprises a low noise amplifier (LNA).

5. The method of claim 1, wherein each of plurality of transmitters comprises a high power amplifier (HPA).

6. The method of claim 1, wherein the first and second beam group transmit switching patterns are different.

7. The method of claim 1, wherein the gateway switch structure changes from sequentially switching the at least P forward link signals to sequentially switching the at least Q forward link signals, as a result of rain fade making at least one gateway terminal unavailable.

8. The method of claim 1, wherein after time T2, the at least P receivers in the plurality of receivers are each configured to receive a different one of the at least P forward link signals from the P gateway terminals, and in the duration of one frame, the gateway switch structure is configured to sequentially switch the at least P forward link signals from the P gateway terminals, in order to provide the at least P forward link signals to the plurality of transmit switches, according to the first gateway switching pattern, and each of the at least P forward link signals is sequentially switched into fixed location beams according to the first beam group transmit switching pattern.

9. The method of claim 8, wherein the gateway switch structure reverts from sequentially switching the at least Q forward link signals to sequentially switching the at least P forward link signals, as result of disappearance of rain fade making at least one gateway terminal available again.

10. The method of claim 1, wherein the satellite has return link capability in addition to forward link capability and further comprises a plurality of receive switches coupled to the inputs of the plurality of receivers, the method further comprising:
    using each receive switch in the plurality of receive switches to sequentially switch return link signals from fixed location beams into a receiver according to a beam group receive switching pattern;
    prior to time T1, sequentially switching the return link signals from multiple fixed location beams into the plurality of receivers according to a first beam group receive switching pattern, and in the duration of one frame, using the gateway switch structure to sequentially switch the return link signals to at least P transmitters in the plurality of transmitters according to the first gateway switching pattern, and using each of the at least P transmitters to transmit a different one of the return link signals to one of the P gateway terminals; and
    after time T1 and before time T2, sequentially switching the return link signals from multiple fixed location beams into the plurality of receivers according to a second beam group receive switching pattern, and in the duration of one frame, using the gateway switch structure to sequentially switch the return link signals to at least Q transmitters in the plurality of transmitters according to the second gateway switching pattern, and using each of the at least Q transmitters to transmit a different one of the return link signals to one of the Q gateway terminals.

11. A satellite communication system having a forward link capability comprising:
- a plurality of gateway terminals;
- a plurality of user terminals;
- a satellite for providing hub-spoke communications between the gateway terminals and the user terminals, the satellite comprising a plurality of receivers having inputs and outputs, a plurality of transmitters having inputs and outputs, the inputs of the plurality of transmitters coupled to the outputs of the plurality of receivers, a plurality of transmit switches coupled to the outputs of the plurality of transmitters, and a gateway switch structure coupled to at least one of: (a) the inputs of the plurality of receivers, (b) the outputs of the plurality receivers and the inputs of the plurality of transmitters, or (c) the outputs of the plurality of transmitters;
- wherein each transmit switch in the plurality of transmit switches is configured to sequentially switch a forward link signal into multiple fixed location beams according to a beam group transmit switching pattern;
- wherein prior to a time T1, at least P receivers in the plurality of receivers are each configured to receive a different one of at least P forward link signals from P gateway terminals, and in the duration of one frame, the gateway switch structure is configured to sequentially switch the at least P forward link signals from the P gateway terminals, in order to provide the at least P forward link signals to the plurality of transmit switches, according to a first gateway switching pattern, and each of the at least P forward link signals is sequentially switched into fixed location beams according to a first beam group transmit switching pattern;
- wherein after time T1 and before a time T2, at least Q receivers in the plurality of receivers are each configured to receive a different one of at least Q forward link signals from Q gateway terminals, and in the duration of one frame, the gateway switch structure is configured to sequentially switch the at least Q forward link signals from the Q gateway terminals, in order to provide the at least Q forward link signals to the plurality of transmit switches, according to a second gateway switching pattern, and each of the at least Q forward link signals is sequentially switched into fixed location beams according to a second beam group transmit switching pattern;
- wherein P and Q are both non-zero, positive integers, and Q<P; and
- wherein the first and second gateway switching patterns are different.

12. The satellite communication system of claim 11, wherein the gateway switch structure comprises a switch matrix positioned between the plurality of receivers and the plurality of transmitters.

13. The satellite communication system of claim 11, wherein the gateway switch structure comprises at least one receive-side outer switch positioned before the plurality of receivers.

14. The satellite communication system of claim 11, wherein each of the plurality of receivers comprises a low noise amplifier (LNA).

15. The satellite communication system of claim 11, wherein each of plurality of transmitters comprises a high power amplifier (HPA).

16. The satellite communication system of claim 11, wherein the first and second beam group transmit switching patterns are different.

17. The satellite communication system of claim 11, wherein the gateway switch structure changes from sequentially switching the at least P forward link signals to sequentially switching the at least Q forward link signals, as result of rain fade making at least one gateway terminal unavailable.

18. The satellite communication system of claim 11, wherein after time T2, the at least P receivers in the plurality of receivers are each configured to receive a different one of the at least P forward link signals from the P gateway terminals, and in the duration of one frame, the gateway switch structure is configured to sequentially switch the at least P forward link signals from the P gateway terminals, in order to provide the at least P forward link signals to the plurality of transmit switches, according to the first gateway switching pattern, and each of the at least P forward link signals is sequentially switched into fixed location beams according to the first beam group transmit switching pattern.

19. The satellite communication system of claim 18, wherein the gateway switch structure reverts from sequentially switching the at least Q forward link signals to sequentially switching the at least P forward link signals, as result of disappearance of rain fade making at least one gateway terminal available again.

20. The satellite communication system of claim 11 having a return link capability in addition to forward link capability,
- wherein the satellite further comprises a plurality of receive switches coupled to the inputs of the plurality of receivers;
- wherein each receive switch in the plurality of receive switches is configured to sequentially switch return link signals from fixed location beams into a receiver according to a beam group receive switching pattern;
- wherein prior to time T1, the return link signals from multiple fixed location beams are sequentially switched into the plurality of receivers according to a first beam group receive switching pattern, and in the duration of one frame, the gateway switch structure is configured to sequentially switch the return link signals to at least P transmitters in the plurality of transmitters according to the first gateway switching pattern, and the at least P transmitters are each configured to transmit a different one of the return link signals to one of the P gateway terminals; and
- wherein after time T1 and before time T2, the return link signals from multiple fixed location beams are sequentially switched into the plurality of receivers according to a second beam group receive switching pattern, and in the duration of one frame, the gateway switch structure is configured to sequentially switch the return link signals to at least Q transmitters in the plurality of transmitters according to the second gateway switching pattern, and the at least Q transmitters are each configured to transmit a different one of the return link signals to one of the Q gateway terminals.

21. A satellite having a forward link capability comprising:
a plurality of receivers having inputs and outputs;
a plurality of transmitters having inputs and outputs, the inputs of the plurality of transmitters coupled to the outputs of the plurality of receivers;
a plurality of transmit switches coupled to the outputs of the plurality of transmitters;
wherein each transmit switch in the plurality of transmit switches is configured to sequentially switch a forward link signal into multiple fixed location beams according to a beam group transmit switching pattern;
a gateway switch structure coupled to at least one of: (a) the inputs of the plurality of receivers, (b) the outputs of the plurality receivers and the inputs of the plurality of transmitters, or (c) the outputs of the plurality of transmitters;
a beam switch controller coupled to the plurality of transmit switches and to the gateway switch structure, the beam switch controller configured to store one or more beam group transmit switching patterns and one or more gateway switching patterns;
wherein prior to a time T1, at least P receivers in the plurality of receivers are each configured to receive a different one of at least P forward link signals from P gateway terminals, and in the duration of one frame, the gateway switch structure is configured to sequentially switch the at least P forward link signals from the P gateway terminals, in order to provide the at least P forward link signals to the plurality of transmit switches, according to a first gateway switching pattern, and each of the at least P forward link signals is sequentially switched into fixed location beams according to a first beam group transmit switching pattern;
wherein after time T1 and before a time T2, at least Q receivers in the plurality of receivers are each configured to receive a different one of at least Q forward link signals from Q gateway terminals, and in the duration of one frame, the gateway switch structure is configured to sequentially switch the at least Q forward link signals from the Q gateway terminals, in order to provide the at least Q forward link signals to the plurality of transmit switches, according to a second gateway switching pattern, and each of the at least Q forward link signals is sequentially switched into fixed location beams according to a second beam group transmit switching pattern;
wherein P and Q are both non-zero, positive integers, and Q<P; and
wherein the first and second gateway switching patterns are different.

22. The satellite of claim 21 wherein the beam switch controller is configured to receive the one or more beam group transmit switching patterns and the one or more gateway switching patterns using an in-band uplink signal.

23. The satellite of claim 21 wherein the beam switch controller is configured to receive the one or more beam group transmit switching patterns and the one or more gateway switching patterns using an out-of-band uplink signal.

* * * * *